US012617149B2

(12) United States Patent
Yao et al.

(10) Patent No.: US 12,617,149 B2
(45) Date of Patent: May 5, 2026

(54) SYSTEMS AND METHODS FOR TREATING A PRINTED MODEL

(71) Applicant: LUXCREO (BEIJING) INC., Beijing (CN)

(72) Inventors: Zhifeng Yao, Beijing (CN); Guang Mike Zhu, Beijing (CN); Yisi Lu, Beijing (CN); Kaifeng Zhao, Beijing (CN); Menglong Hu, Beijing (CN)

(73) Assignee: LUXCREO (BEIJING) INC., Beijing (CN)

( * ) Notice: Subject to any disclaimer, the term of this patent is extended or adjusted under 35 U.S.C. 154(b) by 412 days.

(21) Appl. No.: 17/807,380

(22) Filed: Jun. 16, 2022

(65) Prior Publication Data

US 2022/0324165 A1 Oct. 13, 2022

Related U.S. Application Data

(63) Continuation of application No. PCT/CN2020/136196, filed on Dec. 14, 2020.

(30) Foreign Application Priority Data

Dec. 18, 2019 (WO) ................ PCT/CN2019/126134

(51) Int. Cl.
  B29C 64/188 (2017.01)
  B29C 71/02 (2006.01)
  (Continued)

(52) U.S. Cl.
  CPC ............ B29C 64/188 (2017.08); B29C 71/02 (2013.01); B33Y 40/20 (2020.01);
  (Continued)

(58) Field of Classification Search
  CPC ... B33Y 40/20; B29C 71/02; B29C 2071/022; B29C 2071/027; B29C 67/0077;
  (Continued)

(56) References Cited

U.S. PATENT DOCUMENTS

2011/0211220 A1 9/2011 Yamada
2016/0054955 A1 2/2016 Nakamura
(Continued)

FOREIGN PATENT DOCUMENTS

CN 104210109 A 12/2014
CN 104816480 A 8/2015
(Continued)

OTHER PUBLICATIONS

Overview of materials for Polylactic Acid (PLA) Biopolymer retrieved from <https://www.matweb.com/search/DataSheet.aspx? MatGUID=ab96a4c0655c4018a8785ac4031b9278&ckck=1> (Year: 2025).*
(Continued)

*Primary Examiner* — Susan D Leong
*Assistant Examiner* — Vipul Malik
(74) *Attorney, Agent, or Firm* — METIS IP LLC

(57) ABSTRACT

The present disclosure relates to systems and methods for treating a printed model. The methods may include placing at least a portion of the printed model into a heat treatment medium. The methods may further include performing a heat treatment on the printed model based at least in part on the heat treatment medium. The heat treatment medium may provide a constraint force to prevent a deformation of the printed model during the heat treatment. And the methods may also include obtaining a printed object based at least in part on the heat treatment performed on the printed model.

19 Claims, 7 Drawing Sheets

500

(51) Int. Cl.

| | | |
|---|---|---|
| *B33Y 40/20* | (2020.01) | |
| *B29L 12/00* | (2006.01) | |
| *B33Y 80/00* | (2015.01) | |

(52) U.S. Cl.
CPC ... *B29C 2071/022* (2013.01); *B29L 2012/005* (2013.01); *B33Y 80/00* (2014.12)

(58) Field of Classification Search
CPC ........ B28B 1/001; B22F 3/008; B22F 3/1055; F05D 2230/20; F05D 2230/22; F05D 2230/30; F05D 2230/31; F05D 2230/312; F05D 2230/313; F05D 2230/314
See application file for complete search history.

(56) References Cited

U.S. PATENT DOCUMENTS

| | | | |
|---|---|---|---|
| 2016/0207109 A1 | 7/2016 | Buller et al. | |
| 2017/0072627 A1 | 3/2017 | Li | |
| 2017/0151631 A1 | 6/2017 | Kuo et al. | |
| 2017/0297109 A1 | 10/2017 | Gibson et al. | |
| 2018/0370165 A1 | 12/2018 | Hikmet | |
| 2019/0258440 A1 | 8/2019 | Kawaura | |
| 2019/0336649 A1* | 11/2019 | Béduer | C12M 1/12 |
| 2020/0324470 A1* | 10/2020 | Walker | B29C 71/02 |
| 2020/0376746 A1 | 12/2020 | Ball et al. | |
| 2021/0354376 A1* | 11/2021 | Achten | B29C 64/165 |
| 2021/0394391 A1* | 12/2021 | Minary-Jolandan ... | B33Y 80/00 |
| 2022/0288877 A1* | 9/2022 | Tan | B33Y 10/00 |

FOREIGN PATENT DOCUMENTS

| | | | | | |
|---|---|---|---|---|---|
| CN | 108527868 | A | 9/2018 | | |
| CN | 108859097 | | 11/2018 | | |
| CN | 108859097 | A * | 11/2018 | | |
| CN | 109732914 | A | 5/2019 | | |
| CN | 110042214 | A | 7/2019 | | |
| CN | 110347356 | A | 10/2019 | | |
| EP | 0436352 | B1 | 8/1994 | | |
| EP | 1674192 | A1 | 6/2006 | | |
| EP | 1674192 | B1 | 8/2009 | | |
| EP | 3424688 | A1 | 1/2019 | | |
| WO | WO-2017113180 | A1 * | 7/2017 | ............ | B29C 67/00 |
| WO | 2019083876 | A1 | 5/2019 | | |
| WO | 2021120025 | A1 | 6/2021 | | |

OTHER PUBLICATIONS

Overview of materials for Epoxy, High Temperature retrieved from <https://www.matweb.com/search/DataSheet.aspx?MatGUID=7edc700f902841f29d5578fd5f182f5b> (Year: 2025).*

Overview of materials for Acrylonitrile Butadiene Styrene (ABS) retrieved from <https://www.matweb.com/search/datasheet.aspx?MatGUID=3a8afcddac864d4b8f58d40570d2e5aa> (Year: 2025).*

International Search Report in PCT/CN2020/136196 mailed on Mar. 11, 2021, 5 pages.

Written Opinion in PCT/CN2020/136196 mailed on Mar. 11, 2021, 6 pages.

International Search Report in PCT/CN2019/126134 mailed on Sep. 22, 2020, 8 pages.

Written Opinion in PCT/CN2019/126134 mailed on Sep. 22, 2020, 5 pages.

First Office Action in Chinese Application No. 201980003984.X mailed on Dec. 3, 2021, 14 pages.

Yuzo Kitazawa et al., Thermoreversible High-temperature Gelation of an Ionic Liquid with Poly (Benzyl Methacrylate-b-methyl Methacrylate-b-benzyl Methacrylate) Triblock Copolymer, Soft Matter, 8067-8074, 2012.

* cited by examiner

SYSTEMS AND METHODS FOR TREATING A PRINTED MODEL

CROSS-REFERENCE TO RELATED APPLICATIONS

This application is a continuation of International Patent Application No. PCT/CN2020/136196, filed on Dec. 14, 2020, which claims priority to International Patent Application No. PCT/CN2019/126134, filed on Dec. 18, 2019, the contents of each of which are hereby incorporated by reference.

TECHNICAL FIELD

The present disclosure generally relates to printing field, and in particular, to systems and methods for treating a printed model.

BACKGROUND

With the development of computer and mechanical technologies, the exploration of three-dimensional (3D) printing has developed rapidly nowadays. During a 3D printing process, a 3D printing system can obtain a printed model by using, for example, a fused deposition modeling technique, a photocuring technique, etc. Further, the system may perform a heat treatment on the printed model to improve properties of the printed model. However, during the heat treatment, a deformation of the printed model may occur, which may affect the properties and/or characteristics (e.g., shape, size) of a final printed object. Therefore, it is desirable to provide systems and methods for treating a printed model efficiently and accurately, thereby reducing a deformation of the printed model and improving properties of the printed model.

SUMMARY

An aspect of the present disclosure relates to a method for treating a printed model. The method may include placing at least a portion of the printed model into a heat treatment medium. The method may further include performing a heat treatment on the printed model based at least in part on the heat treatment medium. The heat treatment medium may provide a constraint force to prevent a deformation of the printed model during the heat treatment. And the method may also include obtaining a printed object based at least in part on the heat treatment performed on the printed model.

Another aspect of the present disclosure relates to a system. The system may include at least one storage medium including a set of instructions and at least one processor in communication with the at least one storage medium. When executing the set of instructions, the at least one processor may be directed to cause the system to place at least a portion of the printed model into a heat treatment medium. The at least one processor may be directed to cause the system further to perform a heat treatment on the printed model based at least in part on the heat treatment medium. The heat treatment medium may provide a constraint force to prevent a deformation of the printed model during the heat treatment. And the at least one processor may be directed to cause the system further to obtain a printed object based at least in part on the heat treatment performed on the printed model.

A further aspect of the present disclosure relates to a system. The system may include a printed model placing module configured to place at least a portion of the printed model into a heat treatment medium. The system may further include a heat treatment module configured to perform a heat treatment on the printed model based at least in part on the heat treatment medium. The heat treatment medium may provide a constraint force to prevent a deformation of the printed model during the heat treatment. And the system may also include a printed object obtaining module configured to obtain a printed object based at least in part on the heat treatment performed on the printed model.

A still further aspect of the present disclosure relates to a non-transitory computer readable medium. The non-transitory computer readable medium may include executable instructions that, when executed by at least one processor, direct the at least one processor to perform a method. The method may include placing at least a portion of the printed model into a heat treatment medium. The method may further include performing a heat treatment on the printed model based at least in part on the heat treatment medium. The heat treatment medium may provide a constraint force to prevent a deformation of the printed model during the heat treatment. And the method may also include obtaining a printed object based at least in part on the heat treatment performed on the printed model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
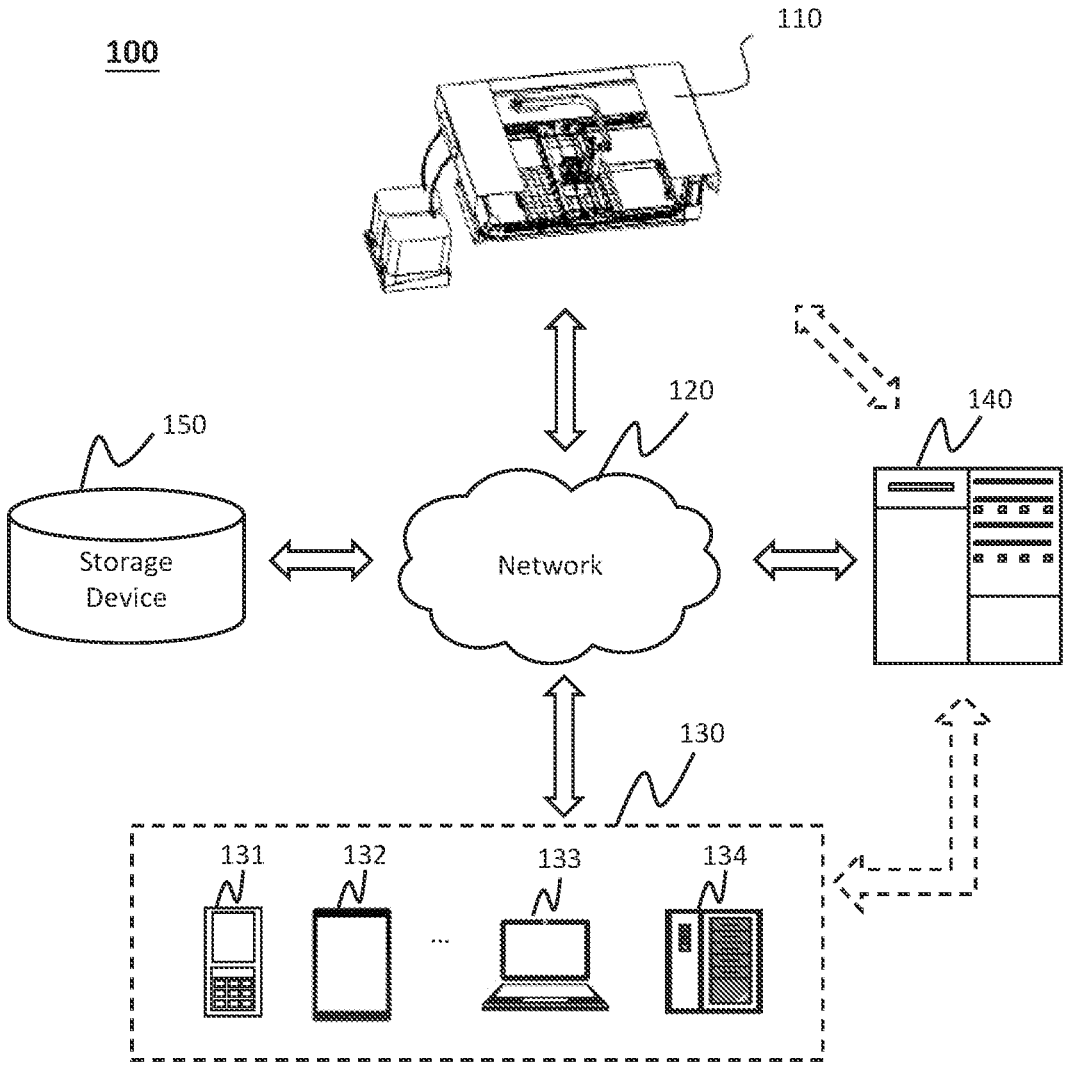
FIG. 1 is a schematic diagram illustrating an exemplary printing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block" used herein refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for performing on computing devices (e.g., processor 210 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to performing). Such software code may be stored, partially or fully, on a storage device of the performing computing device, for performing by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for treating a printed model. The systems may place at least a portion of the printed model into a heat treatment medium (e.g., an inert liquid or a physical gel). The systems may perform a heat treatment on the printed model based at least in part on the heat treatment medium. The heat treatment medium may provide a constraint force to prevent a deformation of the printed model during the heat treatment. The systems may further obtain a printed object based at least in part on the heat treatment performed on the printed model. According to the systems and methods of the present disclosure, a heat treatment medium may be used to provide a constraint force for the printed model to prevent a deformation of the printed model during the heat treatment, thereby improving quality of the printed object and reducing a defective rate in the printing process.

FIG. 1 is a schematic diagram illustrating an exemplary printing system according to some embodiments of the present disclosure. As illustrated, the printing system 100 may include a printer 110, a network 120, a terminal device 130, a processing device 140, and a storage device 150. The components of the printing system 100 may be connected in one or more of various ways. For example, the printer 110 may be connected to the processing device 140 through the network 120. As another example, the printer 110 may be connected to the processing device 140 directly (as indicated by the bi-directional arrow in dotted lines linking the printer 110 and the processing device 140). As a further example, the storage device 150 may be connected to the processing device 140 directly or through the network 120. As still a further example, the terminal device 130 may be connected to the processing device 140 directly (as indicated by the bi-directional arrow in dotted lines linking the terminal device 130 and the processing device 140) or through the network 120.

The printer 110 may be configured to build an object (e.g., a three-dimensional (3D) object) by treating printing materials based on instructions from the processing device 140. For example, the printer 110 may successively stack the printing materials layer by layer based on a predetermined printing model. In some embodiments, the printing material may include a plastic material, a resin material, a metal material, a rubber material, a wax material, or the like, or any combination thereof. For example, the printing materials may be a resin material including thermal-curing components and photocurable components. The photocurable components may be cured by light beams and the thermal-curing components may be cured in a heating process. In some embodiments, the printer 110 may correspond to a plurality of types. Exemplary types may include a stereo lithography (SLA) printer, a polymer jetting printer, a selective laser sintering (SLS) printer, a selective laser melting (SLM) printer, an electron beam melting (EBM) printer, a fused deposition modeling (FDM) printer, a layer laminate manufacturing (LLM) printer, an aerosol printer, a bioplotter printer, or the like, or any combination thereof.

Take an FDM printer as an example, the FDM printer may include a control unit, a feeding unit, a nozzle, a moving unit, a detecting unit, a platform, a display device, and/or any other suitable components.

The control unit may be configured to process information and/or data for printing. For example, the control unit may receive a predetermined printing model (e.g., a digital model) of an object from other components (e.g., the processing device 140, the terminal device 130) of the printing system 100 and discretize the digital mode into point cloud data. As used herein, the point cloud data may refer to a recording of the digital model in a finite number of points, each of which contains a set of three-dimensional coordinates. The control unit may further analyze the point cloud data using a certain algorithm and determine a moving path for printing. Furthermore, the control unit may control the nozzle (or the moving unit) to move based on the moving path such that a printed model may be formed on the platform. In some embodiments, the control unit may be integrated into the processing device 140 and one or more functions of the control unit may be implemented by the processing device 140.

The feeding unit may be configured to provide printing materials. For example, the feeding unit may provide the printing materials to the nozzle to be extruded. In some embodiments, the feeding unit may provide the printing materials at a predetermined flow rate. For example, the printing materials may be filaments and the feeding unit may heat-melt the printing materials at a predetermined flow rate. As another example, the printing materials may be liquid resins and the feeding unit may extrude the liquid resins directly at a predetermined flow rate.

The nozzle may be configured at the opening of the feeding unit. In some embodiments, the nozzle may include a channel that allows the printing materials to be extruded in a predetermined size and/or shape. In some embodiments, the nozzle may also have a heating function which may be used to melt the printing materials and extrude the melted printing materials to the platform.

The moving unit may move according to the moving path determined by the control unit, such that the printing materials may be laid up in a predetermined direction. For example, the moving unit may drive the nozzle and/or the feeding unit to move in accordance with the moving path for printing.

The detecting unit may be configured to obtain real-time images associated with intermediate states during a printing process. In some embodiments, the detecting unit may include an image sensor. The image sensor may capture an image of an intermediate printed model after a processing of a layer is completed. In some embodiments, the detecting unit may include a plurality of image sensors. The plurality of image sensors may capture a plurality of images (e.g., images corresponding to different angles) of the intermediate printed model which may be used to obtain a stereoscopic image (e.g., a 3D image) of the intermediate printed model based on an image processing algorithm (e.g., an image stitching technique, a coordinate conversion technique). In some embodiments, the detecting unit may transmit the image(s) to other components (e.g., the terminal device 130, the processing device 140) of the printing system 100 via the network 120. Further, the processing device 140 may analyze the image(s) and determine whether a printing defect occurs during the printing process. The terminal device 130 may also display the image(s) via a user interface.

The display device may be configured to display information and/or data associated with the printing process. For example, the display device may receive image(s) from the detecting unit and display the image(s) on a screen thereof. As another example, the display device may receive messages from other components (e.g., the processing device 140, the terminal device 130) of the printing system 100 and display the messages on the screen thereof.

Further, take an SLA printer as an example, the SLA printer may create an object by selectively curing a resin layer by layer using light beams. In some embodiments, the SLA printer may include a control unit, a resin tank, a photocuring unit, a detecting unit, a platform, a display device, or any other suitable components.

Similar to the control unit in the FDM printer, the control unit in the SLA printer may also be configured to process information and/or data for printing. For example, the control unit may control the photocuring unit and/or the platform to create a printed model based on the point cloud data.

The resin tank may be configured to accommodate liquid resin including photocurable components which may be cured by light beams emitted by the photocuring unit layer by layer on the platform, such that the printed model may be created.

The photocuring unit may cure at least a portion (e.g., the photocurable components) of the liquid resin using light beams. The photocuring unit may include a light source that may emit light beams from various directions and the liquid resin (e.g., the photocurable components) may be cured by the light beams emitted from the light source. Exemplary light beams may include an ultraviolet beam, a visible light beam, a laser beam, or the like, or any combination thereof.

Similar to the detecting unit in the FDM printer, the detecting unit in the SLA printer may also be configured to obtain real-time images associated with intermediate states during a printing process.

Similar to the display device in the FDM printer, the display device in the SLA printer may also be configured to display information and/or data associated with the printing process.

In some embodiments, the printing system 100 may also include a heat treatment unit (e.g., a thermal-curing unit, an annealing treatment unit) configured to perform a heat treatment on the printed model. For example, the heat treatment unit may be a heating device (e.g., an oven, a water bath heating device) included in the printer 110. After the printed model is created, the processing device 140 may cause the platform to move the printed model into the heating device to be heat treated. As another example, the heat treatment unit may be an independent heating device attached to the printer 110. As a further example, the heat treatment unit may also be a separate heating device. After the printed model is created, the printed model may be moved into the external heating device to be heated automatically or manually by an operator.

The network 120 may include any suitable network that can facilitate the exchange of information and/or data for the printing system 100. In some embodiments, one or more components (e.g., the printer 110, the terminal device 130, the processing device 140, the storage device 150) of the printing system 100 may communicate with one or more other components of the printing system 100 via the network 120. For example, the processing device 140 may obtain a real time image associated with an intermediate printed model from the printer 110 via the network 120. In some embodiments, the network 120 may be any type of wired or wireless network, or a combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the printing system 100 may be connected to the network 120 to exchange data and/or information.

The terminal device 130 may include a mobile device 131, a tablet computer 132, a laptop computer 133, a desktop computer 134, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a smart control device of an intelligent electrical apparatus, a smart monitoring device, a smart television, a smart video camera, a smart interphone, or the like, or any combination thereof. In some embodiments, the wearable device may include a smart bracelet, smart footgear, a pair of smart glasses, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a Hololens, a Gear VR, etc. In some embodiments, the printer 110 and/or the processing device 140 may be remotely operated through the terminal device 130. In some embodiments, the printer 110 and/or the processing device 140 may be operated through the terminal device 130 via a wireless connection. In some embodiments, the terminal device 130 may receive information and/or instructions inputted by a user and send the received information and/or instructions to the printer 110 or the processing device 140 via the network 120. In some embodiments, the terminal device 130 may receive data and/or information from the processing device 140. In some embodiments, the terminal device 130 may be part of the processing device 140. In some embodiments, the terminal device 130 may be omitted.

The processing device 140 may process data and/or information obtained from the printer 110, the terminal device 130, and/or the storage device 150. For example, the processing device 140 may obtain operation information (e.g., starting printing, stopping printing, starting curing) from the terminal device 130 or the storage device 150 and determine operation instructions based on the operation information. Further, the processing device 140 may transmit the operation instructions to the printer 110. As another example, after a printed model is obtained, the processing device 140 may direct the heat treatment device to perform a heat treatment on the printed model. In some embodiments, the processing device 140 may be a single server or a server group. The server group may be centralized or distributed. In some embodiments, the processing device 140 may be local or remote. For example, the processing device 140 may access information and/or data stored in or acquired by the printer 110, the terminal device 130, and/or the storage device 150 via the network 120. As another example, the processing device 140 may be directly connected to the printer 110, the terminal device 130, and/or the storage device 150 to access stored or acquired information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be integrated into the printer 110. In some embodiments, the processing device 140 may be implemented on a computing device 200 including one or more components illustrated in FIG. 2 in the present disclosure.

The storage device 150 may store data and/or instructions. In some embodiments, the storage device 150 may store data obtained from the printer 110, the terminal device 130, and/or the processing device 140. For example, the storage device 150 may store real-time images associated with an intermediate printed model obtained by the detecting unit of the printer 110. In some embodiments, the storage device 150 may store data and/or instructions that the processing device 140 may execute or use to perform exemplary methods described in the present disclosure. For example, the storage device 150 may store instructions that the processing device 140 may execute to treating a printed model. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the printer 110, the processing device 140, the terminal device 130) of the printing system 100. One or more components of the printing system 100 may access the data or instructions stored in the storage device 150 via the network 120. In some embodiments, the storage device 150 may be directly connected to or communicate with one or more components (e.g., the printer 110, the processing device 140, the terminal device 130) of the printing system 100. In some embodiments, the storage device 150 may be part of the processing device 140.

In some embodiments, the printing system 100 may further include one or more power supplies (not shown in FIG. 1) connected to one or more components (e.g., the printer 110, the processing device 140, the terminal device 130, the storage device 150) of the printing system 100.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 2:
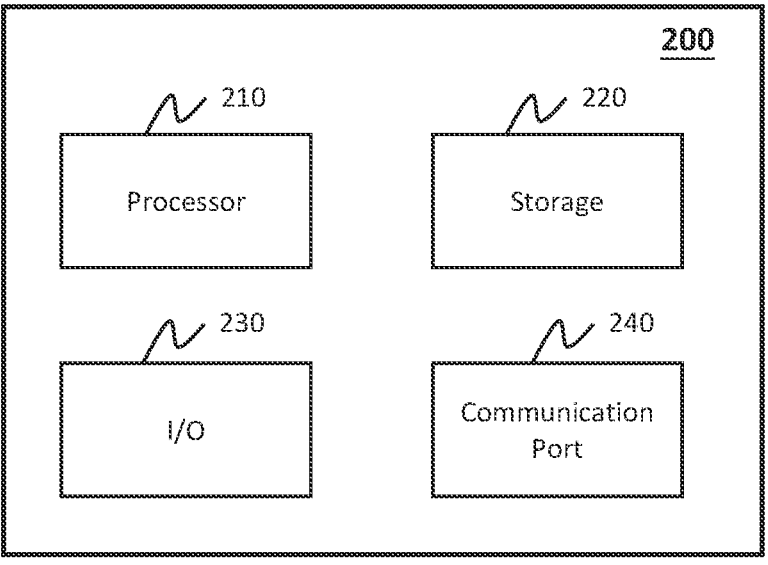
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the processing device 140 may be implemented on the computing device 200. As illustrated in FIG. 2, the computing device 200 may include a processor 210, a storage 220, an input/output (I/O) 230, and a communication port 240.

The processor 210 may execute computer instructions (program code) and perform functions of the processing device 140 in accordance with techniques described herein. The computer instructions may include routines, programs, objects, components, signals, data structures, procedures, modules, and/or functions, which perform particular functions described herein. For example, the processor 210 may cause the platform of the printer 110 to place at least a portion of the printed model into a heat treatment medium to be heat treated. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be noted that the computing device 200 in the present disclosure may also include multiple processors, and thus operations of a method that are performed by one processor as described in the present disclosure may also be jointly or separately performed by the multiple processors. For example, if in the present disclosure the processor of the computing device 200 executes both operations A and B, it should be understood that operations A and B may also be performed by two different processors jointly or separately in the computing device 200 (e.g., a first processor executes operation A and a second processor executes operation B, or the first processor and the second processor jointly execute operations A and B).

The storage 220 may store data/information obtained from the printer 110, the terminal device 130, the storage device 150, or any other component of the printing system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 for treating a printed model.

The I/O 230 may input or output signals, data, or information. In some embodiments, the I/O 230 may enable user interaction with the processing device 40. In some embodiments, the I/O 230 may include an input device and an output device. Exemplary input devices may include a keyboard, a mouse, a touch screen, a microphone, a trackball, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

Merely by way of example, a user (e.g., an operator) may input operation information (e.g., a predetermined printing model, a time point or a time duration associated with a photocuring operation, a time point or a time duration associated with a thermal-curing operation, a temperature of the thermal-curing operation) via the I/O 230. The I/O 230 may also display real-time images of the printed model.

The communication port 240 may be connected to a network (e.g., the network 120) to facilitate data communications. The communication port 240 may establish connections between the processing device 140 and the printer 110, the terminal device 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 240 may be a standardized communication port, such as RS232, RS485, etc.

Figure 3:
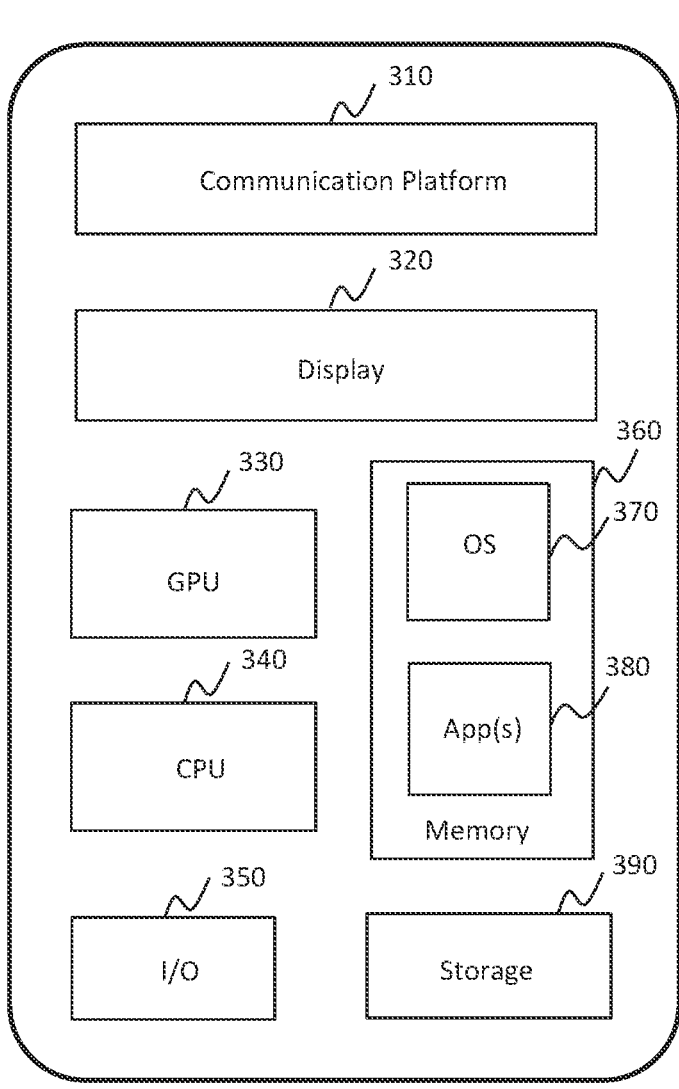
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal device 130 may be implemented on the mobile device 300. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS™, Android™' Windows Phone™) and one or more applications 380 may be loaded into the memory 360 from the storage 390 in order to be executed by the CPU 340. The applications 380 may include a browser or any other suitable mobile apps for receiving and rendering information relating to a treatment of a printed model or other information from the processing device 140. User interactions with the information stream may be achieved via the I/O 350 and provided to the processing device 140 and/or other components of the printing system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the treatment of a printed model as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
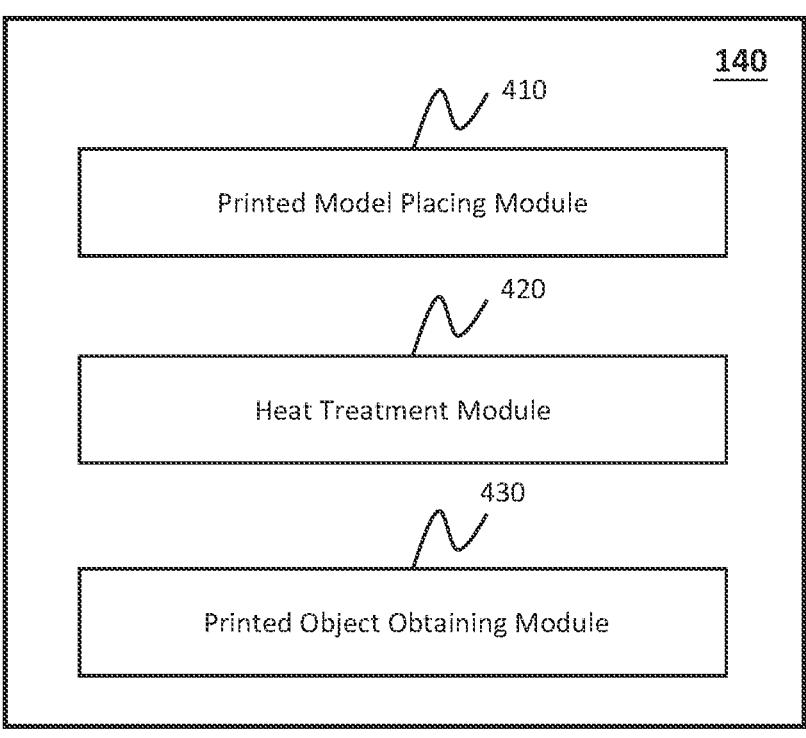
FIG. 4 is a block diagram illustrating an exemplary processing device according to some embodiments of the present disclosure.

FIG. 4 is a block diagram illustrating an exemplary processing device according to some embodiments of the present disclosure. The processing device 140 may include a printed model placing module 410, a heat treatment module 420, and a printed object obtaining module 430.

The printed model placing module 410 may be configured to place at least a portion of a printed model into a heat treatment medium. In some embodiments, the printed model placing module 410 may be configured to place the at least a portion of the printed model into the heat treatment medium automatically. For example, the printed model placing module 410 may cause a movable device to move the printed model and place the at least a portion of the printed model into the heat treatment medium. In some embodiments, the printed model placing module 410 may be configured to place the at least a portion of the printed model into the heat treatment medium semi-automatically. For example, the printed model placing module 410 may monitor the printing process based on image(s) captured by the detecting unit and may transmit a message to a display device to remind an operator after the printed model is obtained. Further, the operator may place the at least a portion of the printed model into the heat treatment medium manually or through a machine arm.

The heat treatment module 420 may be configured to perform a heat treatment on the printed model based at least in part on the heat treatment medium. In some embodiments, the heat treatment module 420 may be configured to perform the heat treatment on the printed model by heating the heat treatment medium. For example, the entire printed model may be placed into the heat treatment medium completely. The heat treatment module 420 may direct a heating source to heat the heat treatment medium gradually to a predetermined temperature during which heat may be conducted to the printed model gradually. In some embodiments, the heat treatment module 420 may be configured to perform the heat treatment on the printed model by heating the heat treatment medium and the printed model simultaneously. In some embodiments, the heat treatment module 420 may perform the heat treatment on the printed model according to a heat treatment time (e.g., 8 h~48 h). In some embodiments, the heat treatment module 420 may perform the heat treatment on the printed model according to a heat treatment temperature (e.g., 60° C.~160° C.).

The printed object obtaining module 430 may be configured to obtain a printed object based at least in part on the heat treatment performed on the printed model. In some embodiments, the printed object obtaining module 430 may be configured to separate a heat treated printed model from the heat treatment medium. In some embodiments, the printed object obtaining module 430 may be further configured to obtain the printed object based on the heat treated printed model. In some embodiments, the printed object obtaining module 430 may obtain the heat treated printed model separated from the heat treatment medium as the printed object directly. In some embodiments, the printed object obtaining module 430 may obtain the printed object by performing a post-treatment on the heat treated printed model. For example, the printed object obtaining module 430 may obtain the printed object by washing the heat treated printed model such that printing materials and/or heat treatment medium remaining on the heat treated printed model may be removed and the printed object may be obtained. As another example, the printed object obtaining module 430 may obtain the printed object by removing (e.g., dissolving) the heat treatment medium remaining on the heat treated printed model using a chemical solution which should not chemically react with the printed model.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the processing device 140 may include a storage module (not shown) used to store information and/or data (e.g., the hollow ratio of the printed model, the suspended parameter of the printed model, the elastic parameter associated with the printed model, information associated with the heat treatment medium) associated with the heat treatment. As another example, the printed model placing module 410 may be divided into a printed model obtaining unit (not shown) and a printed model placing unit (not shown). The printed model obtaining unit may be configured to obtain a printed model by, for example, performing a photocuring treatment on printing materials, performing a fused deposition modeling treatment on printing materials, etc. The printed model placing unit may be configured to place at least a portion of a printed model into a heat treatment medium.

Figure 5:
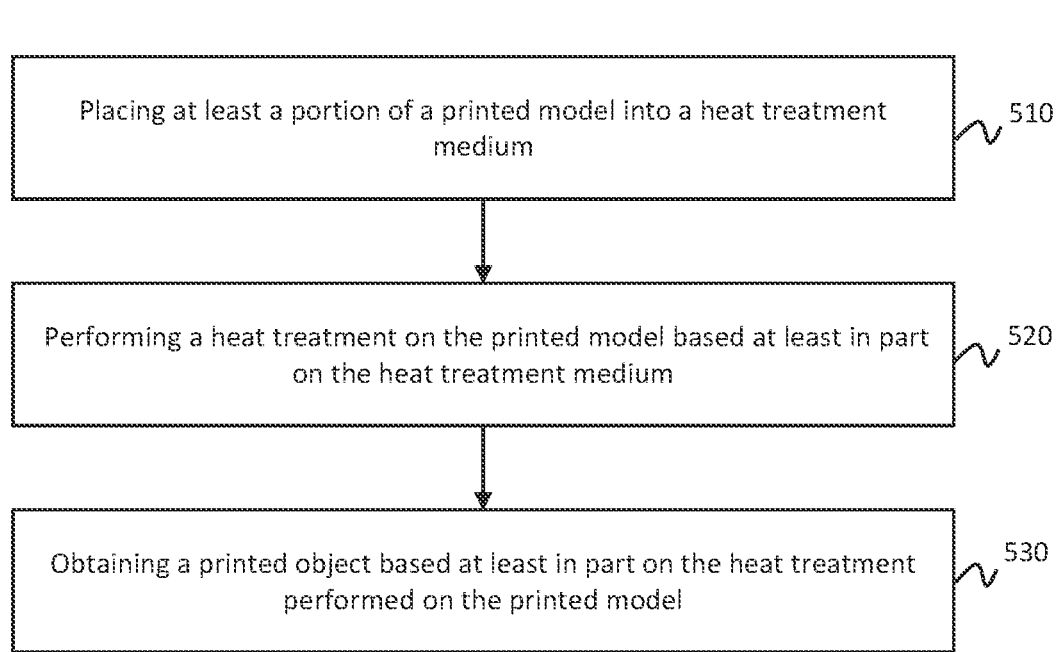
FIG. 5 is a flowchart illustrating an exemplary process for obtaining a printed object according to some embodiments of the present disclosure.

FIG. 5 is a flowchart illustrating an exemplary process for obtaining a printed object according to some embodiments of the present disclosure. In some embodiments, the process 500 may be implemented as a set of instructions (e.g., an application) stored in the storage 220. The processor 210 and/or the modules in FIG. 4 may execute the set of instructions, and when executing the instructions, the processor 210 and/or the modules may be configured to perform the process 500. The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 140 (e.g., the printed model placing module 410) may place at least a portion of a printed model into a heat treatment medium. Specifically, the processing device 140 may direct the platform where the printed model is formed to move to place at least a portion of the printed model into the heat treatment medium.

In some embodiments, the printed model may be obtained by performing a printing technique and/or a treatment on printing materials. Exemplary printing techniques and/or treatments may include a photocuring treatment, a fused deposition modeling (FDM) treatment, a polymer jetting technique, a selective laser sintering (SLS) technique, a selective laser melting (SLM) technique, an electron beam melting (EBM) technique, a layer laminate manufacturing (LLM) technique, an aerosol technique, a bioplotter technique, or the like, or any combination thereof. As described in connection with FIG. 1, the printing materials may include a plastic material, a resin material, a metal material, a rubber material, a wax material, or the like, or any combination thereof.

In some embodiments, the printed model may be obtained by performing a photocuring treatment on printing materials. As used herein, the photocuring treatment may refer to a photoinduced hardening (e.g., a light-based curing operation) performed on the printing materials.

In some embodiments, as described in connection with FIG. 1, a printed model generation device (which may be integrated into or independent of the processing device 140) may cause the photocuring unit to perform the photocuring treatment on the printing material. For example, take a resin material including photocurable components as an example, the printed model generation device may determine a photocuring path for the photocuring treatment based on a predetermined printing model (which may be pre-designed using a CAD software and/or based on 3D scan data) and cause the photocuring unit to emit light beams to the resin material based on the photocuring path. Further, the photocurable components included in the resin material may be cured such that a cured model may be formed layer by layer, which may be regarded as the printed model.

In some embodiments, the printed model may be obtained by performing a fused deposition modeling (FDM) treatment on the printing materials. As used herein, the FDM treatment may refer to a 3D printing process in which filamentous printing materials may be fed through a moving extruder head (e.g., a nozzle) and deposited on a growing model. For example, the printed model generation device may determine a modeling path for the FDM treatment based on a predetermined printing model. Then the printed model generation device may feed the filamentous printing materials to the extruder head which can move along a 3-axis system (e.g., a 3-axis system including x-direction, y-direction, and z-direction). Further, the filamentous printing materials may be melt in the extruder head and may be extruded to the platform based on the modeling path, and may be further quickly cooled and solidified. Accordingly, the printed model generation device may generate the printed model by performing the above operations layer by layer.

In some embodiments, in order to improve the properties (e.g., a tensile strength) of the printed model, a heat treatment may be performed on the printed model. However, during the heat treatment, a deformation of the printed model may occur due to gravity of the printed model itself, a temperature change associated with the heat treatment, or the like, or any combination thereof. Accordingly, an improved heat treatment is provided in the present disclosure, during which the deformation of the printed model is significantly reduced. In other words, the systems and methods of the present disclosure are applied for printed models which are easy to be deformed during the heat treatment. Accordingly, in some embodiments, the printed model may include a printed model with a predetermined hollow ratio, a printed model with a suspended parameter satisfying a first predetermined condition, a printed model made of a material with an elastic parameter satisfying a second predetermined condition, or the like, or any combination thereof.

Figure 6:
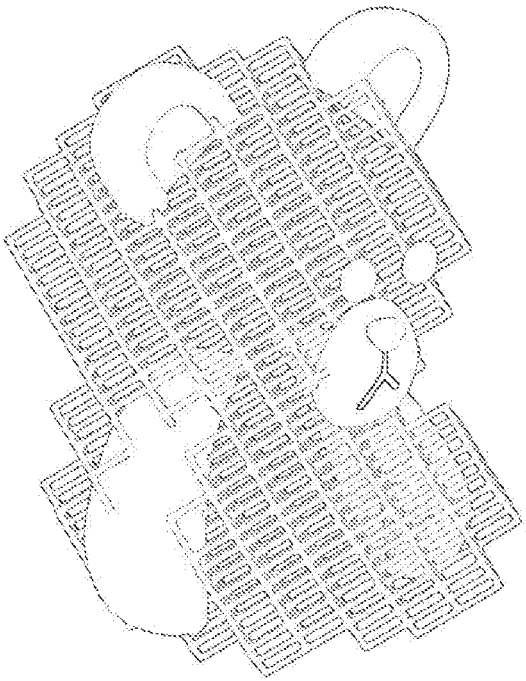
FIG. 6 is a schematic diagram illustrating an exemplary printed model according to some embodiments of the present disclosure.

In some embodiments, the hollow ratio may refer to a ratio of hollow portions of the printed model to the entire printed model. The larger the hollow ratio is, the easier the printed model is to be deformed. For example, the hollow ratio may refer to a ratio of a volume of the hollow portions to a volume of the entire printed model. In some embodiments, the predetermined hollow ratio may be larger than or equal to a predetermined value. For example, the predetermined value may be 40%, 50%, 60%, 70%, 80%, 85%, 90%, 95%, 99.9%, etc. In some embodiments, the predetermined hollow ratio may correspond to a hollow ratio range. For example, the hollow ratio range may be 40%-99.9%. As another example, the hollow ratio range may be 50%-99%. As a further example, the hollow ratio range may be 60%-99%. As still a further example, the hollow ratio range may be 70%-98%. As still a further example, the hollow ratio range may be 80%-96%. As still a further example, the hollow ratio range may be 90%-95%. Merely by way of example, as illustrated in FIG. 6, the printed model may be a printed model with a hollow ratio of 93.8%.

Figure 7:
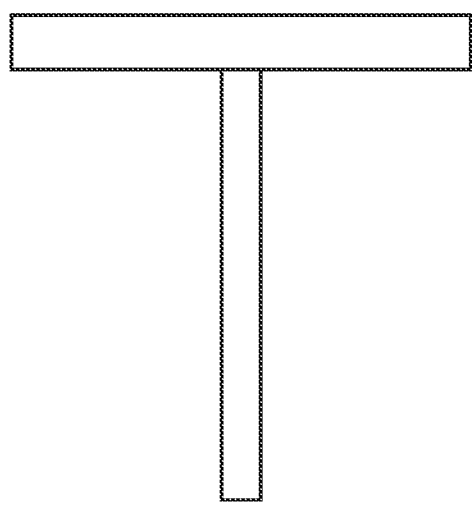
FIG. 7 is a schematic diagram illustrating another exemplary printed model according to some embodiments of the present disclosure.
Figure 8:
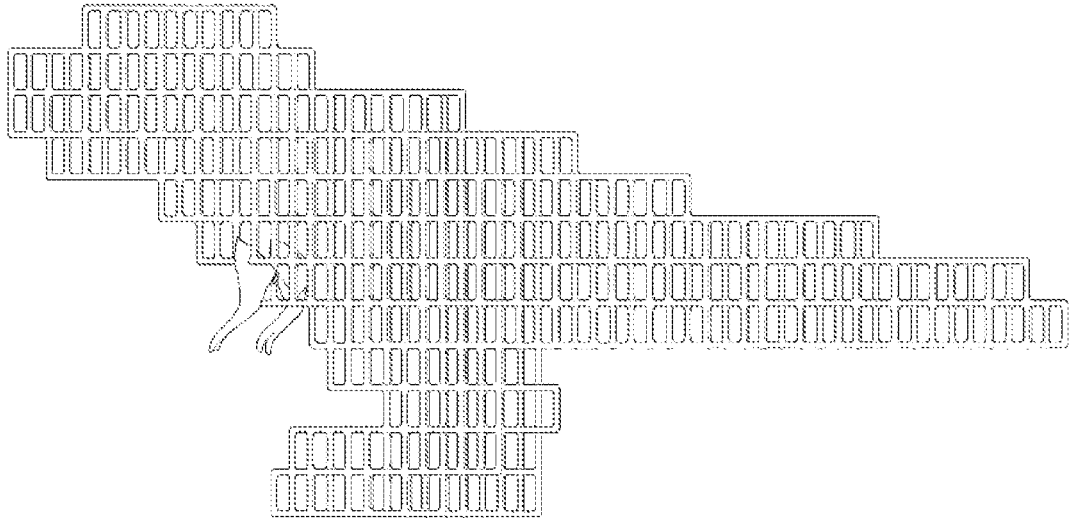
FIG. 8 is a schematic diagram illustrating a further exemplary printed model according to some embodiments of the present disclosure.

In some embodiments, the suspended parameter may include a suspended angle, a suspended length, a suspended ratio, or the like, or any combination thereof. As used herein, the suspended angle may refer to an angle between a suspending portion of the printed model and a horizontal direction or a vertical direction. The suspended length may refer to a length of the suspending portion of the printed model. The suspended ratio may refer to a ratio of the suspended portion of the printed model to the entire printed model. Accordingly, the printed model with the suspended parameter satisfying the first predetermined condition may refer to a printed model with a suspended angle larger than an angle threshold (e.g., 5°, 10°, 15°), a suspended length larger than a length threshold (e.g., 5 mm, 10 mm), and/or a suspended ratio larger than a ratio threshold (e.g., 40%, 50%). The thresholds may be default settings of the printing system 100 or may be adjustable under different situations. For example, as illustrated in FIG. 7, the printed model may be a printed model with a "T" shape, a suspended angle of 90°, a suspended length of 7 mm, and a suspended ratio of 45%. As another example, as illustrated in FIG. 8, the printed model may be a printed model with a hollow ratio in a range from 87% to 90% and a suspended angle of 90°.

In some embodiments, the elastic parameter may include a Young's modulus, or the like. The smaller the Young's modulus is, the easier the printed model may be deformed. Accordingly, the printed model made of a material with the elastic parameter satisfying the second predetermined condition may be a printed model made of a material with a Young's modulus smaller than a predetermined Young's modulus value (e.g., 20 GPa).

In some embodiments, the printed model may further include a printed model with a predetermined pressure on a force-bearing surface thereof. As used herein, the force-bearing surface may refer to a contact surface of the printed model with other surfaces (e.g., a surface of the platform of the printer 110, a surface on which the printed model is placed in a heating device, etc.). A force (e.g., gravity) applied on the printed model may be distributed on the contact surface. Correspondingly, the pressure may refer to a ratio of the force to an area of the contact surface (i.e., a contact area). The smaller the contact area is, the larger the pressure may be, then the easier the printed model may be deformed. In some embodiments, the predetermined pressure may be larger than or equal to a pressure threshold (e.g., 0.01 MPa) or within a predetermined pressure range.

As described above, the processing device 140 may place at least a portion of the printed model to the heat treatment medium which can provide a constraint force (e.g., a buoyant force, a support force) to prevent (or reduce) a deformation of the printed model during the heat treatment.

In some embodiments, the heat treatment medium may be stable and/or inert. As used herein, "stable" refers to that a physical property or a chemical property of the heat treatment medium remains unchanged under a predetermined condition (e.g., under a relatively high temperature); "inert" refers to that the heat treatment medium does not chemically react with other substances contained in the printed model under the predetermined condition. For example, if a medium corrodes, decomposes, polymerizes, burns, or explodes under the predetermined condition, it may be considered to be "unstable." In some alternative embodiments, the heat treatment medium may be unstable or non-inert. Merely by way of example, the heat treatment medium may include one or more non-inert components. In some embodiments, the non-inert component(s) may react with the printed model so as to promote the curing process of the printed model. In some embodiments, the heat treatment medium may include a liquid, a solid, and/or a gas, or any combination thereof. In some embodiments, the liquid may include water, an inorganic liquid (e.g., salt water), an organic liquid (e.g., mineral oil, fluorinated organic liquid, etc.), or the like, or any combination thereof. In some embodiments, the solid may include inorganic salt, organic salt, metal oxide, metal, or the like, or any combination thereof. In some embodiments, the gas may include inert gas (e.g., nitrogen, argon, carbon dioxide, etc.), non-inert gas (e.g., oxygen), or the like, or any combination thereof. Merely by way of example, the heat treatment medium may include an inert liquid, a physical gel, a solid particle, water vapor, or the like, or any combination thereof. In some embodiments, the heat treatment medium may include a mixture of a liquid, a solid, and/or a gas. For example, the heat treatment medium may include a mixture of a liquid and a solid (e.g., a solid particle suspension). In some embodiments, gaps in at least a portion of the printed model that the solid cannot reach may be filled by the liquid in the mixture, thereby providing a buoyant force to the printed model more effectively, and the solid in the mixture may adhere to or contact the surface of the printed model so as to cause depressions on the surface of the printed model, thereby obtaining a printed model with an appearance effect. As another example, the heat treatment medium may include a mixture of a liquid and a gas. For illustration purposes, when the printed model is placed into a heat treatment medium including a liquid, an inert gas may be added into the liquid. In some embodiments, the inert gas may be used to prevent a reaction between the printed model and the liquid.

In some embodiments, the heat treatment medium may be in different states (e.g., a liquid state, a solid state, and/or a gas state) under different situations (e.g., in different temperature ranges). Merely by way of example, the heat treatment medium may be in a solid state at a relatively high temperature (e.g., a heat treatment temperature), and may be in a liquid state (or a gas state) at a relatively low temperature (e.g., a room temperature). In such cases, after a heat treatment process, the heat treatment medium may change to the liquid state. Accordingly, the heat treated printed model may be separated from the heat treatment medium easily.

In some embodiments, the inert liquid may include at least one of water, salt water, an inert organic liquid, or the like, or any combination thereof. Merely by way of example, the water may be distilled water. The salt water may include a sodium chloride solution, a potassium chloride solution, a calcium chloride solution, a sodium sulfate solution, etc. Alternatively or additionally, the salt water may correspond to a certain concentration (e.g., 20%, 40%, 60%). For example, the salt water may be a sodium chloride solution with a saturation concentration of 23%. The inert organic liquid may include silicone oil, mineral oil, inert fluorinated organic, or the like, or any combination thereof. In some embodiments, the inert liquid may include any other inert liquid (e.g., an ionic liquid) which may not dissolve or swell the print model.

In some embodiments, the inert liquid may provide a buoyant force to the printed model to prevent (or reduce) the deformation of the printed model. In some embodiments, a ratio between the buoyant force provided by the inert liquid and gravity of the printed model may be larger than or equal to 20%. For example, the ratio between the buoyant force provided by the inert liquid and the gravity of the printed model may be larger than or equal to 50%. In some embodiments, the buoyant force may be adjusted by adjusting a density of the inert liquid. Specifically, for different printed models with different gravity, inert liquids with different densities may be selected to provide corresponding buoyant forces.

In some embodiments, the physical gel may include a gel state and a liquid state. In some embodiments, the gel state may correspond to a temperature range higher than a first temperature threshold (e.g., 135° C.). For example, the gel state may correspond to a temperature range from 100° C. to 400° C. As another example, the gel state may correspond to a temperature range from 135° C. to 140° C. In some embodiments, the liquid state may correspond to a temperature range lower than a second temperature threshold (e.g., 30° C.). For example, the liquid state may correspond to a temperature range from 0° C. to 30° C. In some embodiments, the physical gel may also include an intermediate state. For example, within a temperature range from the first temperature threshold (e.g., 135° C.) to the second temperature threshold (e.g., 30° C.), a portion of the physical gel may be in the liquid state and other portions of the physical gel may be in the gel state.

In some embodiments, the physical gel may consist of at least a block copolymer (e.g., a triblock copolymer) and an ionic liquid. In some embodiments, a unimolecular dissolution of the triblock copolymer may occur at a relatively low temperature (e.g., a temperature lower than 135° C.) and at least a portion of the physical gel may be in the liquid state at the temperature; a self-assembly of the triblock copolymer may occur at a relatively high temperature (e.g., a temperature higher than or equal to 135° C.) and the physical gel may be in the gel state at the temperature. In some embodiments, a state transition of the physical gel may be reversible. For example, at a temperature lower than 135° C., a portion of the physical gel may be in the liquid state, when the temperature rises to a temperature higher than 135° C., the portion of the physical gel may change to the gel state. Similarly, at a temperature higher than 135° C., the physical gel may be in the gel state, when the temperature drops to a temperature lower than 135° C., a portion the physical gel may change to the liquid state. More descriptions regarding the physical gel may be found in, for example, Yuzo Kitazawa, et al., thermoreversible high-temperature gelation of an ionic liquid with poly (benzyl methacrylate-b-methyl methacrylate-b-benzyl methacrylate) triblock copolymer [J]. Soft Matter, August 2012: 8067, which is hereby incorporated by reference.

In some embodiments, the physical gel may provide a support force to the printed model to prevent (or reduce) the deformation of the printed model. When the at least a portion of the printed model is placed into the physical gel (e.g., when the physical gel is in a gel state at a temperature higher than the first temperature threshold), the at least a portion of the printed model may be wrapped by the physical gel and/or gaps in the at least a portion of the printed model may be filled by the physical gel, such that the physical gel may provide a support force to the printed model. Then the printed model may be heat treated in the physical gel. In some embodiments, after the heat treatment process, the temperature may drop to a temperature lower than the second temperature threshold. Correspondingly, the physical gel may change to the liquid state. In such cases, the heat treated printed model may be separated from the physical gel easily.

In some embodiments, the solid particle may provide a support force to the printed model to prevent (or reduce) the deformation of the printed model. As used herein, the solid particle refers to substances that may be in a solid state under certain conditions (e.g., at a predetermined temperature or in a predetermined temperature range). For example, the solid particle may be in a solid state in a temperature range from 0° C. to 150° C. As another example, the solid particle may be in a solid state at room temperature, and/or in a solid-liquid state in a heating process.

In some embodiments, the heat treatment medium may also realize a heat conduction between a heating source and the at least a portion of the printed model. In some embodiments, a thermal conductivity of the heat treatment medium may correspond to a thermal conductivity range. For example, the thermal conductivity range may be 0.01 W/m·K~100 W/m·K. As another example, the thermal conductivity range may be 0.02 W/m·K~1 W/m·K.

In some embodiments, the heat treatment medium may further include a heat conductive material added to the inert liquid and/or the physical gel. In some embodiments, the heat conductive material may be used to improve the thermal conductivity of the heat treatment medium. In some embodiments, the heat conductive material may also be stable and/or inert. In some embodiments, the heat conductive material may include at least one of a metal nanomaterial, a carbon-based nanomaterial, a boron nitride-based nanomaterial, or the like, or any combination thereof.

In some embodiments, the at least a portion of the printed model may be placed into the heat treatment medium automatically. For example, the processing device 140 may cause a movable device (e.g., the platform of the printer 110, a machine arm, an external moving device) to move the printed model and place the at least a portion of the printed model into the heat treatment medium. In some embodiments, the at least a portion of the printed model may be placed into the heat treatment medium semi-automatically. For example, the processing device 140 may monitor the printing process based on the image(s) captured by the detecting unit and may transmit a message to a display device (e.g., the display device of the printer 110, a user interface of the terminal device 130) to remind an operator after the printed model is obtained. The message may be in a form of a sound, an image, a text, a video, or the like, or a combination thereof. Further, the operator may place the at least a portion of the printed model into the heat treatment medium manually or through a machine arm.

In some embodiments, a portion of the printed model may be placed into the heat treatment medium and other portions of the printed model may be placed out of the heat treatment medium. For example, a portion with the predetermined hollow ratio and/or a portion with the suspended parameter satisfying the first predetermined condition may be placed into the heat treatment medium. In some embodiments, the entire printed model may be placed into the heat treatment medium.

In 520, the processing device 140 (e.g., the heat treatment module 420) may perform a heat treatment on the printed model based at least in part on the heat treatment medium.

In some embodiments, the processing device 140 may perform the heat treatment on the printed model by heating the heat treatment medium. For example, the entire printed model may be placed into the heat treatment medium. The processing device 140 may direct the heating source to heat the heat treatment medium gradually to a predetermined temperature during which heat may be conducted to the printed model gradually.

In some embodiments, the processing device 140 may perform the heat treatment on the printed model by heating the heat treatment medium and the printed model simultaneously. For example, a portion of the printed model may be placed into the heat treatment medium. The processing device 140 may direct the heating source to heat the heat treatment medium gradually to a predetermined temperature during which heat may be conducted to the printed model gradually. And at the same time, the processing device 140 may direct another heating source (e.g., an oven) to heat a portion of the printed model out of the heat treatment medium.

In some embodiments, the heat treatment may include a thermal curing treatment by which a toughness of the printed model may be increased and/or a hardness of the printed model may be increased. As used herein, the thermal curing treatment may refer to a temperature-induced hardening (e.g., a heat-based curing operation) performed on the printed model. During the thermal curing treatment, polymer chains of printing materials of the printed model may be caused to cross-link due to heat.

In some embodiments, the heat treatment may include an annealing treatment by which a ductility of the printed model may be increased and/or a hardness of the printed model may be decreased. As used herein, the annealing treatment may refer to a heat treatment that alters physical and/or chemical properties of a material to increase its ductility and/or reduce its hardness. In some embodiments, an annealing temperature of the annealing treatment may be higher than a softening point of the printed model. When heated at a temperature above the softening point, the printed model may be softened and a deformation of the printed model may be caused, during which the heat treatment medium may provide a constraint force to the printed model to reduce the deformation of the printed model.

In some embodiments, the processing device 140 may perform the heat treatment on the printed model according to a heat treatment time. In some embodiments, the heat treatment time may be 0.5 h~200 h. For example, the heat treatment time may be 2 h~100 h. As another example, the heat treatment time may be 8 h~48 h. In some embodiments, the processing device 140 may perform the heat treatment on the printed model according to a heat treatment temperature. In some embodiments, the heat treatment temperature may be 40° C.~500° C. For example, the heat treatment temperature may be 50° C.~200° C. As another example, the heat treatment temperature may be 60° C.~160° C.

In some embodiments, the heat treatment time and/or the heat treatment temperature may be related to a tensile strength of the printed model, an elongation at break of the printed model, a mass change of the printed model, or the like, or any combination thereof. As used herein, the tensile strength may refer to a maximum stress that an object can withstand while being stretched or pulled before breaking, which may indicate a capacity of the object to withstand loads tending to elongate. The elongation at break may refer to a ratio of increased length of an object after breakage to an initial length of the object, which may indicate an ability of the object to resist changes of shape without cracking. The mass change may refer to a ratio of a mass changed (which may be caused by a removal of volatile materials (e.g., uncured monomers)) during the heat treatment to an initial mass of an object.

In some embodiments, the tensile strength of the printed model and/or the elongation at break of the printed model may be used to check whether there are defects inside the printed model. For example, for a printed model with cracks therein, the tensile strength may be relatively low and/or the elongation at break may also relatively low. In some embodiments, during a heat treatment based at least in part on the heat treatment medium, heat may be conducted to the printed model gradually and evenly. Furthermore, the heat treatment medium may provide a constraint force to prevent a deformation of the printed model during the heat treatment. In this case, a probability of defects occurring on the printed model may be reduced such that the printed model after the heat treatment may have a relatively high tensile strength and a relatively high elongation at break.

Merely by way of example, in a set of experiments, heat treatments may be performed on sample printed models under various heat treatment conditions and a deformation ratio of each of the sample printed models may be obtained. As used herein, the deformation ratio may refer to a ratio of a parameter of a deformed portion (e.g., a size, an area, a volume, a mass, etc. of the deformed portion) of the printed model after the heat treatment to a parameter of the entire printed model (e.g., a size, an area, a volume, a mass, etc. of the entire printed model) before the heat treatment. The deformation may refer to changes in a shape or a form of the printed model. Exemplary deformations may include that a straight line on the printed model changes into a curve, a plane on the printed model changes into a curved surface, a distance between two points on the printed model changes to be longer or shorter, or the like, or any combination thereof. In some embodiments, the changes in the shape or the form of the printed model may be due to gravity of the printed model itself, a temperature change associated with the heat treatment, or the like, or any combination thereof. The sample printed models used in the experiments were obtained under a same condition (e.g., obtained by the same SLA printer with the same printing parameters and under the same printing conditions) and properties of the sample printed models are substantially the same. For example, the sample printed models may be the same as the printed model with a hollow ratio of 93.8% illustrated in FIG. 6.

In a first heat treatment condition, a first sample printed model may be placed in water, and further treated in an oven at a heat treatment temperature of 120° C. and for a heat treatment time of 8 hours. After the heat treatment process, the deformation ratio of the first sample printed model is in a range from 6% to 7%.

In a second heat treatment condition, a second sample printed model may be placed in salt water with a concentration of 23%, and further treated in an oven at a heat treatment temperature of 120° C. and for a heat treatment time of 8 hours. After the heat treatment process, the deformation ratio of the second sample printed model is close to zero. That is, there is almost no deformation occurred on the printed model.

In a third heat treatment condition, a third sample printed model may be treated in an oven directly at a heat treatment temperature of 120° C. and for a heat treatment time of 8 hours. After the heat treatment process, the deformation ratio of the third sample printed model is in a range from 15% to 18%.

According to experiment data corresponding to the different heat treatment conditions, both the first sample printed model treated in the water and the second sample printed model treated in the salt water have smaller deformation ratios than the third sample printed model treated in the oven directly. That is, deformations of the sample printed models may be reduced when treated in a heat treatment medium. In addition, the second sample printed model treated in the salt water has a smallest deformation ratio (close to zero). That is, a deformation of the second sample printed model may be significantly reduced when treated in the salt water.

In 530, the processing device 140 (e.g., the printed object obtaining module 430) may obtain a printed object based at least in part on the heat treatment performed on the printed model.

In some embodiments, the processing device 140 may separate a heat treated printed model from the heat treatment medium. For example, if the heat treatment medium is an inert liquid, the processing device 140 may separate the heat treated printed model from the heat treatment medium directly (e.g., using a movable device or manually). As another example, if the heat treatment medium is a physical gel that includes a gel state and a liquid state, the processing device 140 may separate the heat treated printed model from the heat treatment medium when the physical gel is in the liquid state. As a further example, if the heat treatment medium is a solid particle, the heat treated printed model may be separated from the heat treatment medium directly (e.g., by tapping and/or flushing the heat treated printed model with water or gas). As a further example, if the solid particle is soluble in a solvent (e.g., water or other solvents), the processing device 140 may separate the heat treated printed model from the heat treatment medium by cleaning the heat treated printed model using the solvent.

In some embodiments, the processing device 140 may further obtain the printed object based on the heat treated printed model. In some embodiments, the heat treated printed model separated from the heat treatment medium may be obtained as the printed object directly. In some embodiments, the processing device 140 may obtain the printed object by performing a post-treatment on the heat treated printed model. For example, the processing device 140 may obtain the printed object by washing the heat treated printed model separated from the heat treatment medium such that printing materials and/or heat treatment medium remaining on the heat treated printed model may be removed. As another example, the processing device 140 may obtain the printed object by removing (e.g., dissolving) the heat treatment medium remaining on the heat treated printed model using a chemical solution which should not chemically react with the heat treated printed model.

It should be noted that the above description of the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the printed model may not be limited to the printed models described in the present disclosure and the systems and methods of the present disclosure can be applied to any other printed models that require heat treatment. As another example, one or more other optional operations (e.g., a storing operation) may be added elsewhere in the process 500. In the storing operation, the processing device 140 may store information and/or data (e.g., the hollow ratio of the printed model, the suspended parameter of the printed model, the elastic parameter associated with the printed model, information associated with the heat treatment medium) in a storage device (e.g., the storage device 150) disclosed elsewhere in the present disclosure.

In some embodiments, the heat treatment medium may include one or more kinds of solid particles. In some embodiments, the solid particle may include an inert solid particle. As used herein, the inert solid particle refers to a solid particle that is stable and/or inert under a predetermined condition (e.g., under a relatively high temperature). For example, the inert solid particle may have a physical property or a chemical property that remains unchanged under the predetermined condition. As another example, the inert solid particle may not chemically react with other substances contained in the printed model under the predetermined condition. In some embodiments, the inert solid particle may be stable and/or inert in a predetermined temperature range. In some embodiments, the heat treatment may be performed on the printed model at a heat treatment temperature within the predetermined temperature range. In some embodiments, the predetermined temperature range may include the heat treatment temperature. For example, an upper limit of the predetermined temperature range may be larger than or equal to a maximum heat treatment temperature. In some embodiments, the upper limit of the predetermined temperature range may be less than or equal to 200° C. In some embodiments, the upper limit of the predetermined temperature range may be less than or equal to 100° C. In some embodiments, the upper limit of the predetermined temperature range may be less than or equal to 90° C. In some embodiments, the upper limit of the predetermined temperature range may be less than or equal to 70° C. In some embodiments, the upper limit of the predetermined temperature range may be less than or equal to 60° C. In some embodiments, the upper limit of the predetermined temperature range may be less than or equal to 50° C. Optionally or additionally, the solid particle may be unstable and/or active at one or more temperatures beyond the predetermined temperature range, which is not limited in the present disclosure.

In some embodiments, the solid particle may include a soluble solid particle. As used herein, the soluble solid particle refers to a solid particle that may be dissolved in one or more solvents. For example, the soluble solid particle may be dissolved in one or more solvents through a chemical reaction, a physical dissolution, or the like, or any combination thereof. In some embodiment, the one or more solvents may include an organic solvent, an inorganic solvent, or the like. In some embodiments, the one or more solvents may include water, acetic acid, alcohol, or the like, or any combination thereof. For example, the solid particle may be NaCl or $Na_2CO_3$, which may be dissolved in water.

In some embodiments, the solid particle may include inorganic salt, organic salt, metal oxide, metal, or the like, or any combination thereof. Exemplary inorganic salt may include NaCl, $Na_2CO_3$, $KHCO_3$, $Na_3PO_4$, or the like, or any combination thereof. Exemplary metal oxide may include $SiO_2$, MgO, or the like, or any combination thereof. Exemplary metal may include iron, zinc, or the like, or any combination thereof. In some embodiments, the solid particle may include a single substance. For example, the solid particle may include only one kind of substance (e.g., the NaCl, $Na_2CO_3$, $KHCO_3$, $Na_3PO_4$, $SiO_2$, MgO, iron, zinc, etc.). In some embodiments, the solid particle may include a mixture. For example, the solid particle may include two or more kinds of substances. In some embodiments, the solid particle may include a mixture of 2-6 kinds of substances. In some embodiments, the solid particle may include a mixture of 3-5 kinds of substances. In some embodiments, the solid particle may include a mixture of more than 6 kinds of substances. In some embodiments, the two or more kinds of substances in the mixture may be mixed in an equal ratio. In some embodiments, the two or more kinds of substances in the mixture may be mixed in any other ratio (e.g., an arbitrary ratio).

In some embodiments, the solid particle may include a mixture of NaCl and $Na_2CO_3$. In some embodiments, a ratio of a mass of the NaCl to a mass of the $Na_2CO_3$ in the mixture may be in a range from 1:99 to 99:1. In some embodiments, the ratio of the mass of the NaCl to the mass of the $Na_2CO_3$ in the mixture may be in a range from 1:9 to 9:1. In some embodiments, the ratio of the mass of the NaCl to the mass of the $Na_2CO_3$ in the mixture may be in a range from 1:8 to 8:1. In some embodiments, the ratio of the mass of the NaCl to the mass of the $Na_2CO_3$ in the mixture may be in a range from 1:7 to 7:1. In some embodiments, the ratio of the mass of the NaCl to the mass of the $Na_2CO_3$ in the mixture may be in a range from 1:6 to 6:1. In some embodiments, the ratio of the mass of the NaCl to the mass of the $Na_2CO_3$ in the mixture may be in a range from 1:5 to 5:1. In some embodiments, the ratio of the mass of the NaCl to the mass of the $Na_2CO_3$ in the mixture may be in a range from 1:4 to 4:1. In some embodiments, the ratio of the mass of the NaCl to the mass of the $Na_2CO_3$ in the mixture may be in a range from 1:3 to 3:1. In some embodiments, the ratio of the mass of the NaCl to the mass of the $Na_2CO_3$ in the mixture may be in a range from 1:2 to 2:1. In some embodiments, the ratio of the mass of the NaCl to the mass of the $Na_2CO_3$ in the mixture may be 1:1.

In some embodiments, the solid particle may include a mixture of iron and $SiO_2$. In some embodiments, a ratio of a mass of the iron to a mass of the $SiO_2$ in the mixture may be in a range from 1:99 to 99:1. In some embodiments, the ratio of the mass of the iron to the mass of the $SiO_2$ in the mixture may be in a range from 1:9 to 9:1. In some embodiments, the ratio of the mass of the iron to the mass of the $SiO_2$ in the mixture may be in a range from 1:8 to 8:1. In some embodiments, the ratio of the mass of the iron to the mass of the $SiO_2$ in the mixture may be in a range from 1:7 to 7:1. In some embodiments, the ratio of the mass of the iron to the mass of the $SiO_2$ in the mixture may be in a range from 1:6 to 6:1. In some embodiments, the ratio of the mass of the iron to the mass of the $SiO_2$ in the mixture may be in a range from 1:5 to 5:1. In some embodiments, the ratio of the mass of the iron to the mass of the $SiO_2$ in the mixture may be in a range from 1:4 to 4:1. In some embodiments, the ratio of the mass of the iron to the mass of the $SiO_2$ in the mixture may be in a range from 1:3 to 3:1. In some embodiments, the ratio of the mass of the iron to the mass of the $SiO_2$ in the mixture may be in a range from 1:2 to 2:1. In some embodiments, the ratio of the mass of the iron to the mass of the $SiO_2$ in the mixture may be 1:1.

In some embodiments, the solid particle may include a mixture of $Na_3PO_4$ and $SiO_2$. In some embodiments, a ratio of a mass of the $Na_3PO_4$ to a mass of the $SiO_2$ in the mixture may be in a range from 1:99 to 99:1. In some embodiments, the ratio of the mass of the $Na_3PO_4$ to the mass of the $SiO_2$ in the mixture may be in a range from 1:9 to 9:1. In some embodiments, the ratio of the mass of the $Na_3PO_4$ to the mass of the $SiO_2$ in the mixture may be in a range from 1:8 to 8:1. In some embodiments, the ratio of the mass of the $Na_3PO_4$ to the mass of the $SiO_2$ in the mixture may be in a range from 1:7 to 7:1. In some embodiments, the ratio of the mass of the $Na_3PO_4$ to the mass of the $SiO_2$ in the mixture may be in a range from 1:6 to 6:1. In some embodiments, the ratio of the mass of the $Na_3PO_4$ to the mass of the $SiO_2$ in the mixture may be in a range from 1:5 to 5:1. In some embodiments, the ratio of the mass of the $Na_3PO_4$ to the mass of the $SiO_2$ in the mixture may be in a range from 1:4 to 4:1. In some embodiments, the ratio of the mass of the $Na_3PO_4$ to the mass of the $SiO_2$ in the mixture may be in a range from 1:3 to 3:1. In some embodiments, the ratio of the mass of the $Na_3PO_4$ to the mass of the $SiO_2$ in the mixture may be in a range from 1:2 to 2:1. In some embodiments, the ratio of the mass of the $Na_3PO_4$ to the mass of the $SiO_2$ in the mixture may be 1:1.

In some embodiments, a size of the solid particle may be in a range from 1 micrometer (um) to 10 millimeters (mm). As used herein, the size of the solid particle refers to a size of the largest outer size of the solid particle. For example, if the solid particle is or is approximately a sphere, the size of the solid particle may be a diameter of the sphere. As another example, if the solid particle is or is approximately an ellipsoid, the size of the solid particle may be the major axis of the ellipsoid. As a further example, if the solid particle is or is approximately a cube (or a rectangular), the size of the solid particle may be a distance between the two furthest vertex angles of the cube (or the rectangular) (e.g., a length of a diagonal of the cube). In some embodiments, the size of the solid particle may be in a range from 1 um to 8 mm. In some embodiments, the size of the solid particle may be in a range from 1 um to 5 mm. In some embodiments, the size of the solid particle may be in a range from 1 um to 3 mm. In some embodiments, the size of the solid particle may be in a range from 1 um to 1 mm. In some embodiments, the size of the solid particle may be in a range from 1 um to 900 um. In some embodiments, the size of the solid particle may be in a range from 1 um to 800 um. In some embodiments, the size of the solid particle may be in a range from 1 um to 700 um. In some embodiments, the size of the solid particle may be in a range from 1 um to 600 um. In some embodiments, the size of the solid particle may be in a range from 1 um to 500 um. In some embodiments, the size of the solid particle may be in a range from 1 um to 400 um. In some embodiments, the size of the solid particle may be in a range from 1 um to 300 um. In some embodiments, the size of the solid particle may be in a range from 1 um to 200 um. In some embodiments, the size of the solid particle may be in a range from 1 um to 100 um. In some embodiments, the size of the solid particle may be in a range from 1 um to 90 um. In some embodiments, the size of the solid particle may be in a range from 1 um to 80 um. In some embodiments, the size of the solid particle may be in a range from 1 um to 70 um. In some embodiments, the size of the solid particle may be in a range from 1 um to 60 um. In some embodiments, the size of the solid particle may be in a range from 1 um to 50 um. In some embodiments, the size of the solid particle may be in a range from 1 um to 40 um. In some embodiments, the size of the solid particle may be in a range from 1 um to 30 um. In some embodiments, the size of the solid particle may be in a range from 1 um to 20 um. In some embodiments, the size of the solid particle may be in a range from 1 um to 10 um. In some embodiments, the size of the solid particle may be in a range from 5 um to 900 um. In some embodiments, the size of the solid particle may be in a range from 10 um to 800 um. In some embodiments, the size of the solid particle may be in a range from 15 um to 500 um. In some embodiments, the size of the solid particle may be in a range from 20 um to 300 um. In some embodiments, the size of the solid particle may be in a range from 30 um to 100 um. In some embodiments, the size of the solid particle may be in a range from 30 um to 90 um. In some embodiments, the size of the solid particle may be in a range from 40 um to 80 um. In some embodiments, when at least a portion of the printed model is placed into the solid particles for heat treatment, a part of the solid particles may adhere to or contact the surface of the printed model. In some embodiments, the part of the solid particles adhering to or contacting the surface of the printed model may cause depressions on the surface of the printed model due to an interaction of forces (e.g., the gravity of the printed model and a support force provided by the solid particles). In some embodiments, a size of a depression may relate to a size of a corresponding solid particle (e.g., a solid particle adhered to the printed model, a solid particle contacting the printed model, etc.). For example, if the size of the corresponding solid particle is relatively large, the size of the depression may be relatively large. In some embodiments, solid particles of different sizes may be used in the heat treatment medium to form depressions of different sizes. In some embodiments, an appearance effect may be formed by the surface depressions of the printed model. In some embodiments, the appearance effect may relate to the size of the depression(s). In some embodiments, if the size of the depression(s) is relatively large, a texture appearance may be presented. In some embodiments, if the size of the depression(s) is relatively small, a matte appearance may be presented. In some embodiments, in order to obtain a matte appearance on the surface of the printed model, solid particle(s) with a size that is in a range from 1 um to 50 um may be used in the heat treatment medium. In some embodiments, in order to obtain a matte appearance on the surface of the printed model, the size of the solid particle may be in a range from 3 um to 40 um. In some embodiments, in order to obtain a matte appearance on the surface of the printed model, the size of the solid particle may be in a range from 5 um to 35 um. In some embodiments, in order to obtain a matte appearance on the surface of the printed model, the size of the solid particle may be in a range from 10 um to 30 um. In some embodiments, in order to obtain a matte appearance on the surface of the printed model, the size of the solid particle may be in a range from 20 um to 25 um.

In some embodiments, a shape of the solid particle may include a regular shape (e.g., a sphere, a cube, a rectangular) or an irregular shape. In some embodiment, if the solid particle is a mixture including two or more kinds of substances, shapes of the two or more kinds of substances may be the same or different. For example, if the solid particle includes a mixture of NaCl and $Na_2CO_3$, both the NaCl particle and the $Na_2CO_3$ particle may be in the shape of a sphere. As another example, if the solid particle includes a mixture of NaCl and $Na_2CO_3$, the NaCl particle may be in the shape of a sphere, and the $Na_2CO_3$ particle may be in the shape of a cube. In some embodiment, if the solid particle is a mixture including two or more kinds of substances, sizes of the two or more kinds of substances may be the same or different. In some embodiment, if the sizes and/or the shapes of the two or more kinds of substances in a mixture are different, different depressions may be formed on the surface of the printed model. Correspondingly, different appearance effects (e.g., a relatively complex texture) may be formed on the surface of the printed model.

In some embodiments, a ratio of the size of the solid particle to a size of the printed model may be relatively small such that the solid particle(s) may contact the surface of the printed model more evenly, thereby providing a relatively even support force to the printed model. In some embodiments, the ratio of the size of the solid particle to the size of the printed model may be less than 1:100. In some embodiments, the ratio of the size of the solid particle to the size of the printed model may be less than 1:1000. In some embodiments, the ratio of the size of the solid particle to the size of the printed model may be less than $1:10^4$. In some embodiments, the ratio of the size of the solid particle to the size of the printed model may be less than $1:10^5$. In some embodiments, the ratio of the size of the solid particle to the size of the printed model may be less than $1:10^6$. In some embodiments, the ratio of the size of the solid particle to the size of the printed model may be less than $1:10^7$. In some embodiments, the ratio of the size of the solid particle to the size of the printed model may be less than $1:10^8$. In some embodiments, the ratio of the size of the solid particle to the size of the printed model may be less than $1:10^9$. As used herein, the size of the printed model refers to a largest size on the printed model. For example, the size of the printed model may be a distance between two furthest points on the printed model.

Figure 9A:
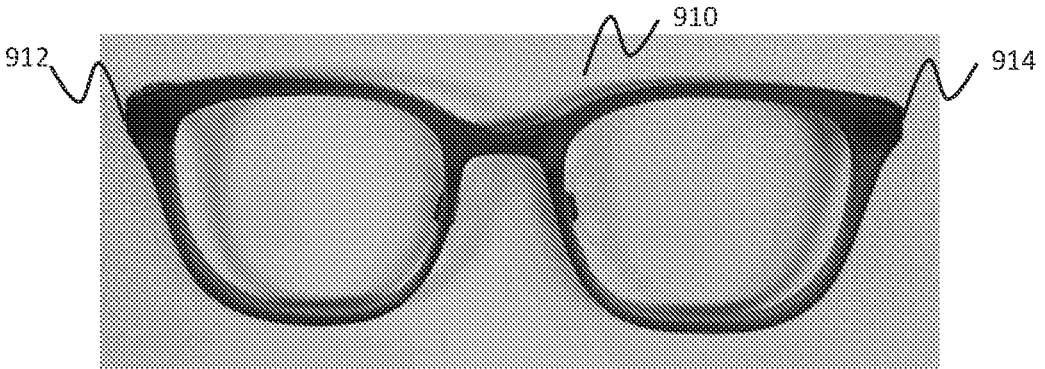
FIG. 9A is a schematic diagram illustrating an exemplary heat treated first glasses frame according to some embodiments of the present disclosure.
Figure 9B:
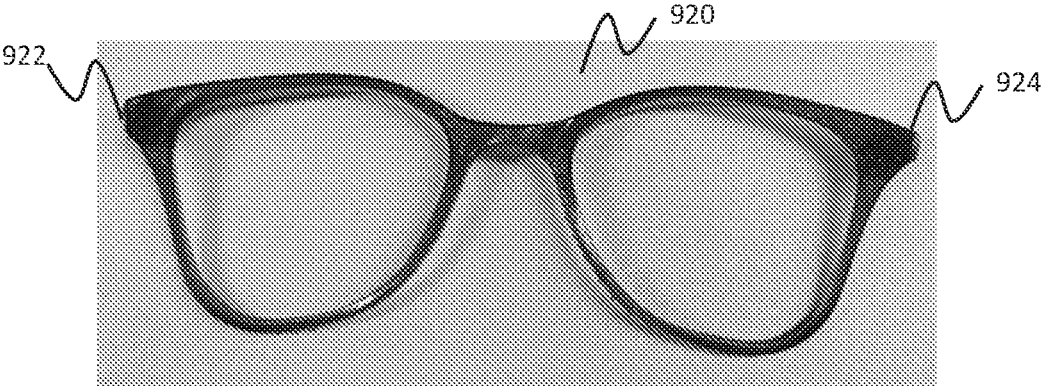
FIG. 9B is a schematic diagram illustrating an exemplary heat treated second glasses frame according to some embodiments of the present disclosure.
Figure 9C:
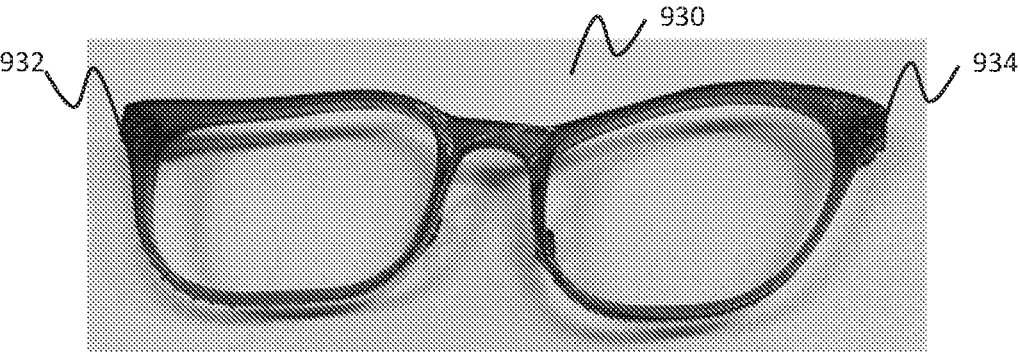
FIG. 9C is a schematic diagram illustrating an exemplary heat treated third glasses frame according to some embodiments of the present disclosure.

Merely by way of example, as shown in FIGS. 9A-9C, heat treatments were performed on sample printed models (e.g., sample glasses frames) under different heat treatment conditions, and different deformations of the sample printed models were generated. The sample printed models used in the heat treatments were obtained under a same condition (e.g., printed using the same printing material and under the same printing condition, and flushed with an iso-propyl alcohol solvent (IPA) after being printed), and properties of the sample printed models were substantially the same. The deformation may refer to a change in a shape or a form of a printed model. Exemplary deformations may include that a straight line on the printed model changes into a curve, a plane on the printed model changes into a curved surface, a distance between two points on the printed model changes, or the like, or any combination thereof. A deformation ratio may be used herein to illustrate the deformation of the sample printed models. The deformation ratio may refer to a ratio of a parameter of a deformed portion (e.g., at least one of a size, an area, a volume, a mass, etc. of the deformed portion) of a printed model after a heat treatment to a parameter of the entire printed model (e.g., a corresponding one of a size, an area, a volume, a mass, etc. of the entire printed model) before the heat treatment.

In a first heat treatment condition, a first glasses frame was placed in $Na_2CO_3$ particles with a size from 50 um to 500 um, and treated in an oven at a heat treatment temperature of 120° C. and for a heat treatment time of 12 hours. After the heat treatment process, the heat treated first glasses frame was separated from the $Na_2CO_3$ particles by tapping the heat treated first glasses frame. FIG. 9A is a schematic diagram illustrating an exemplary heat treated first glasses frame 910 according to some embodiments of the present disclosure. The deformation ratio of the first glasses frame is 0.06%, which may be approximated as 0, i.e., there is substantially no deformation in the first glasses frame.

In a second heat treatment condition, a second glasses frame and a third glasses frame were placed in an oven directly, and treated at a heat treatment temperature of 120° C. and for a heat treatment time of 12 hours. FIG. 9B is a schematic diagram illustrating an exemplary heat treated second glasses frame 920 according to some embodiments of the present disclosure. The deformation ratio of the second glasses frame is in a range from 20% to 40%. FIG. 9C is a schematic diagram illustrating an exemplary heat treated third glasses frame 930 according to some embodiments of the present disclosure. The deformation ratio of the third glasses frame is in a range from 30% to 50%.

In some embodiments, other parameters may be used to analyze or express the heat treatment results of the sample glasses frames. Exemplary parameters may include a levelness between a left frame and a right frame (i.e., whether tops of the left frame and the right frame are on a same horizontal line) of a sample glasses frame, a consistency between the left frame and the right frame (i.e., whether a shape of the left frame is the same as a shape of the right frame), a deformation degree of the left frame and/or the right frame (i.e., whether the left frame and/or the right frame is distorted). As illustrated in FIG. 9A, a left frame 912 and a right frame 914 of the heat treated first glasses frame 910 are in a relatively high levelness, a relatively high consistency, and a relatively low deformation degree. As illustrated in FIG. 9B, a left frame 922 and a right frame 924 of the heat treated second glasses frame 920 are deformed to a relatively high degree, and the left frame 922 is asymmetrical to the right frame 924. As illustrated in FIG. 9C, a top of the left frame 932 and a top of the right frame 934 of the heat treated third glasses frame 930 are not on a same horizontal line, and the left frame 932 and the right frame 934 are severely distorted, which makes the left frame 932 asymmetrical to the right frame 934.

As illustrated above, the first glasses frame treated in the $Na_2CO_3$ particles have a better heat treatment result (e.g., a smaller deformation ratio (e.g., an approximately zero deformation ratio), a higher levelness between a left frame and a right frame, a higher consistency between the left frame and the right frame, a smaller deformation degree, etc.) than the second glasses frame and the third glasses frame treated in the oven directly. That is, deformations of the sample printed models may be significantly reduced or eliminated when treated in a heat treatment medium.

It should be noted that the above description of the heat treatment medium including the solid particle is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the solid particle may not be limited to the inert solid particle described in the present disclosure. One or more kinds of non-inert solid particle may also be used in a heat treatment process. As another example, the solid particle may also include insoluble solid particles.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method for treating a printed model, comprising:
   placing at least a portion of the printed model into a heat treatment medium;
performing a heat treatment on the printed model based at least in part on the heat treatment medium, wherein the heat treatment medium provides a constraint force to prevent a deformation of the printed model during the heat treatment;
   and obtaining a printed object based at least in part on the heat treatment performed on the printed model;
   wherein the portion of the printed model is placed into the heat treatment medium, and the performing the heat treatment on the printed model based at least in part on the heat treatment medium includes:
   directing a heating source to heat the heat treatment medium to a predetermined temperature during which heat is conducted to the printed model gradually;
   and directing another heating source to heat a portion of the printed model out of the heat treatment medium.

2. The method of claim 1, wherein the printed model has a predetermined hollow ratio within a hollow ratio range from 40% to 99.9%, the performing the heat treatment on the printed model based at least in part on the heat treatment medium includes:
   placing a portion of the printed model with the predetermined hollow ratio into the heat treatment medium, and placing other portions of the printed model out of the heat treatment medium.

3. The method of claim 1, wherein the heat treatment medium includes an inert liquid or a physical gel.

4. The method of claim 3, wherein the heat treatment medium is the inert liquid and the inert liquid includes at least one of water, salt water, or an inert organic liquid.

5. The method of claim 1, wherein the heat treatment medium is a solid particle.

6. The method of claim 5, wherein the solid particle is an inert solid particle.

7. The method of claim 5, wherein the solid particle is a soluble solid particle.

8. The method of claim 1, wherein the heat treatment medium includes a heat conductive material added to the heat treatment medium, the heat conductive material being used to improve a thermal conductivity of the heat treatment medium.

9. The method of claim 1, wherein the performing the heat treatment on the printed model based at least in part on the heat treatment medium includes:
   performing the heat treatment on the printed model by heating the heat treatment medium.

10. The method of claim 1, wherein the performing the heat treatment on the printed model based at least in part on the heat treatment medium includes:
   performing the heat treatment on the printed model by heating the heat treatment medium and the printed model simultaneously.

11. The method of claim 1, wherein the performing the heat treatment on the printed model based at least in part on the heat treatment medium includes:
   performing the heat treatment on the printed model according to a heat treatment temperature, the heat treatment temperature being within a temperature range from 60° C. to 160° C.

12. The method of claim 5, wherein a size of the solid particle is in a range from 1 micrometer to 10 millimeters.

13. The method of claim 5, wherein a ratio of a size of the solid particle to a size of the printed model is less than 1:100.

14. The method of claim 1, wherein the printed model has a suspended parameter satisfying a predetermined condition, the predetermined condition including at least one of: a suspended angle of the printed model being larger than 5°, and a suspended length of the printed model being larger than 5 mm.

15. The method of claim 1, wherein a predetermined pressure is on a force-bearing surface of the printed model, the predetermined pressure being larger than or equal to 0.01 MPa.

16. The method of claim 1, wherein the heat treatment medium includes a liquid, and the placing at least a portion of the printed model into the heat treatment medium includes:
   when placing the printed model into the heat treatment medium, adding an inert gas into the liquid, the inert gas being configured to prevent a reaction between the printed model and the liquid.

17. The method of claim 1, wherein the heat treatment medium includes one or more non-inert components, the non-inert component is configured to react with the printed model to promote a curing process of the printed model.

18. The method of claim 5, wherein the solid particle is a mixture of NaCl and $Na_2CO_3$, and a ratio of a mass of the NaCl to a mass of the $Na_2CO_3$ in the mixture is in a range from 1:99 to 99:1.

19. The method of claim 5, wherein the solid particle is a mixture including two or more kinds of substances, and shapes and sizes of the two or more kinds of substances are different.

* * * * *